United States Patent [19]

Farrell

[11] 4,410,390
[45] Oct. 18, 1983

[54] BELT FOLDING APPARATUS

[75] Inventor: Robert E. Farrell, Cuyahoga Falls, Ohio

[73] Assignee: The B. F. Goodrich Company, New York, N.Y.

[21] Appl. No.: 369,324

[22] Filed: Apr. 16, 1982

[51] Int. Cl.³ .............................................. B32B 31/00
[52] U.S. Cl. .................................. 156/461; 156/463; 156/465; 156/443; 156/200; 493/442; 493/443
[58] Field of Search .................................. 156/200-202, 156/204, 443, 459, 461, 463, 464, 465, 467; 493/410, 417, 442-443, 434, 440, 447

[56] References Cited

U.S. PATENT DOCUMENTS

| 2,001,399 | 5/1935 | Scharwath | 493/442 X |
| 2,241,813 | 5/1941 | Gowdy | 156/465 X |
| 3,659,836 | 5/1972 | Neri et al. | 493/442 X |
| 3,897,943 | 8/1975 | Head et al. | 493/443 X |
| 3,978,191 | 8/1976 | Allen et al. | 493/442 X |

Primary Examiner—David A. Simmons
Attorney, Agent, or Firm—Joseph Januszkiewicz

[57] ABSTRACT

A belt folding apparatus wherein a first conveyor orientates belt material along one edge for folding over the belt material that is in excess of the desired amount by a pair of vertically asigned discs in cooperation with inclined rollers that complete the turn over or folding operation. A pair of pressing rollers in cooperation with a second conveyor complete the folding process, afterwhich the folded belt is wound up.

4 Claims, 14 Drawing Figures

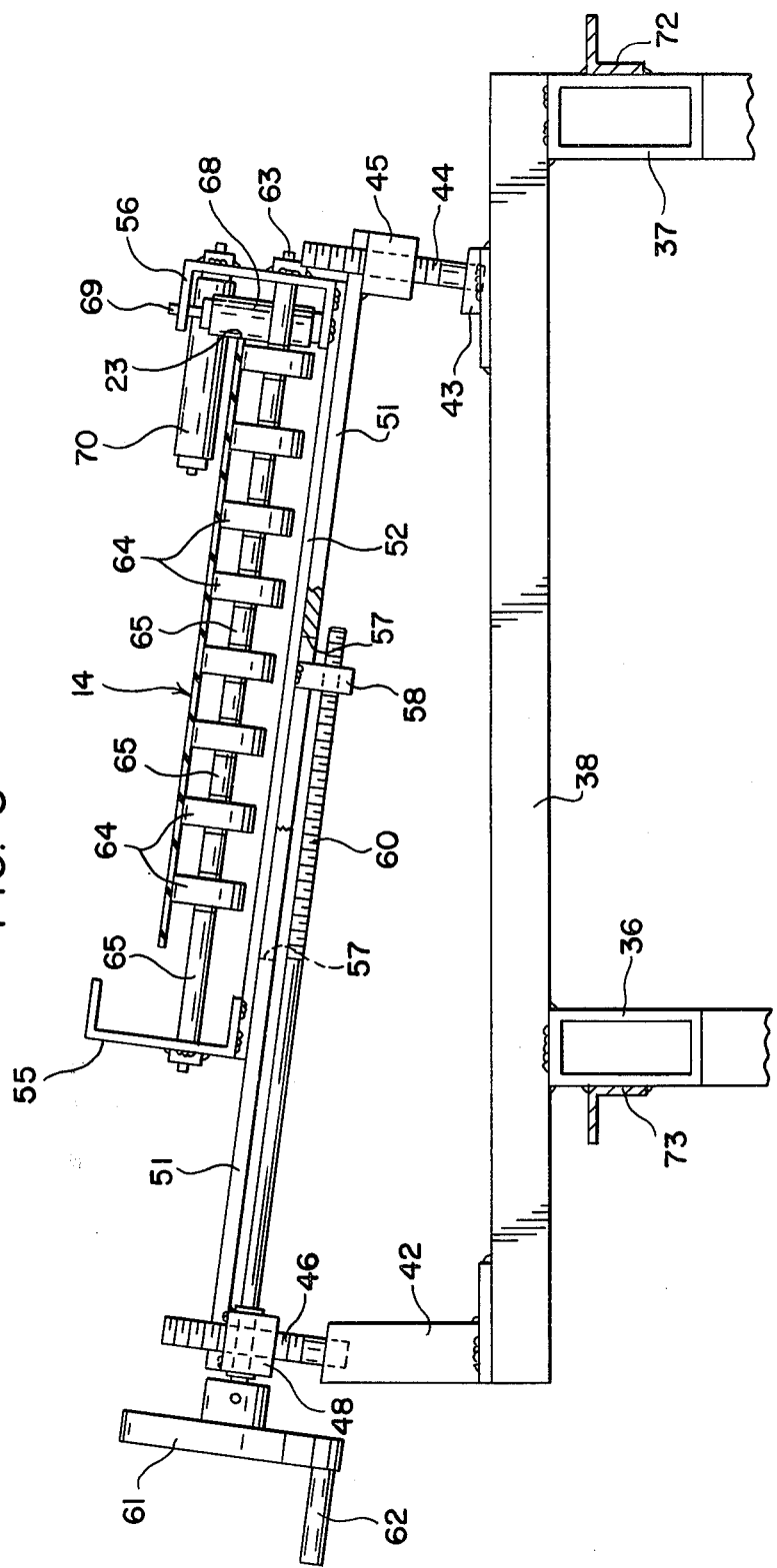

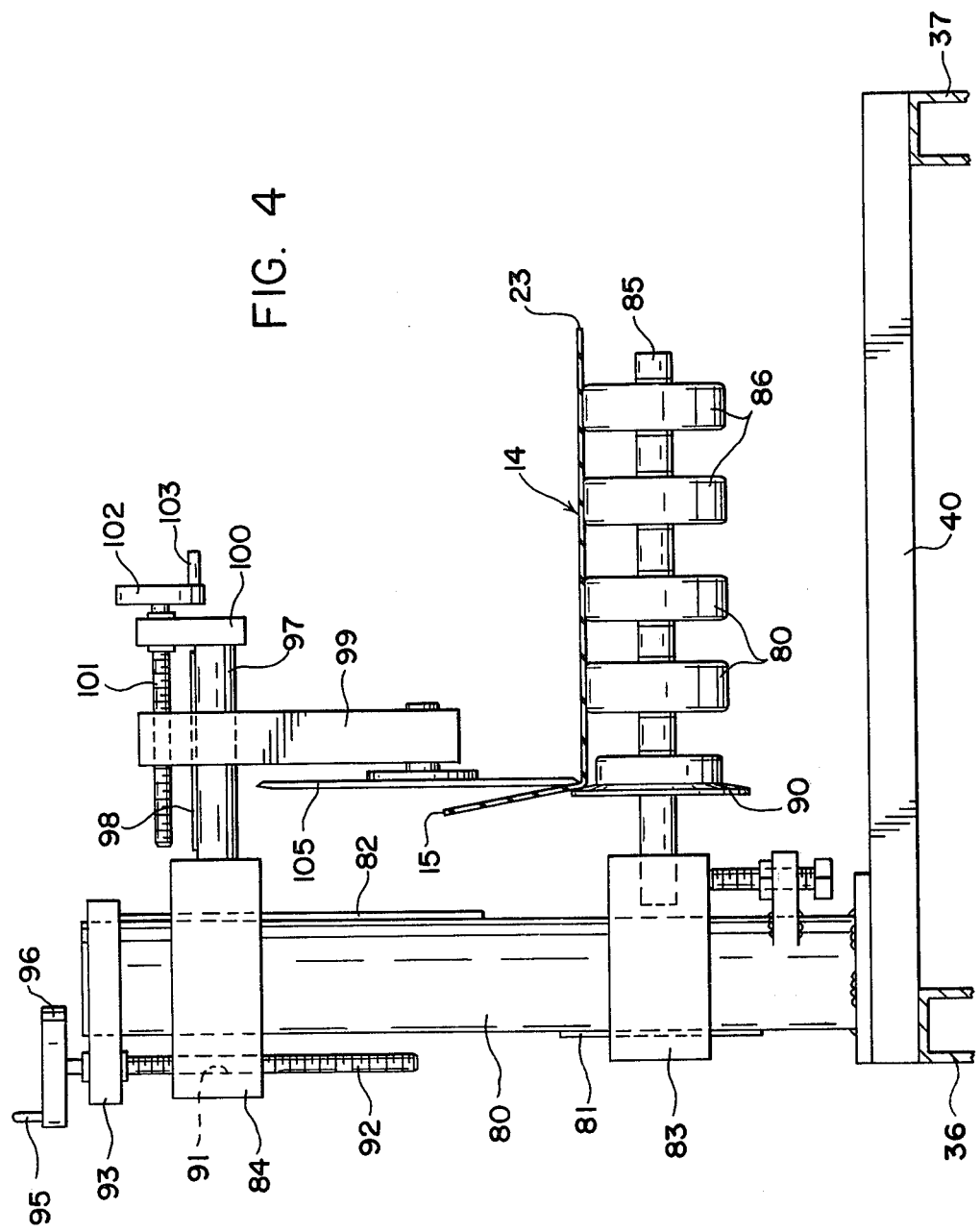

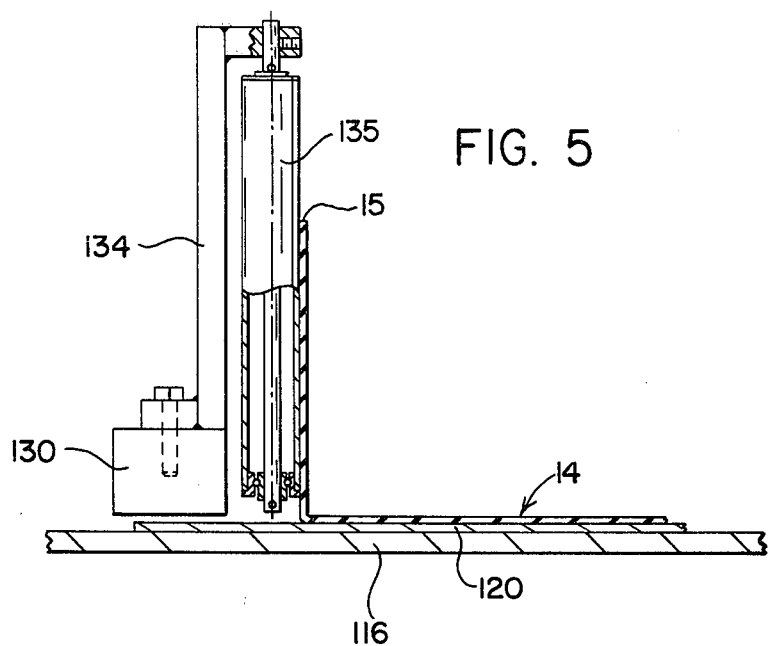
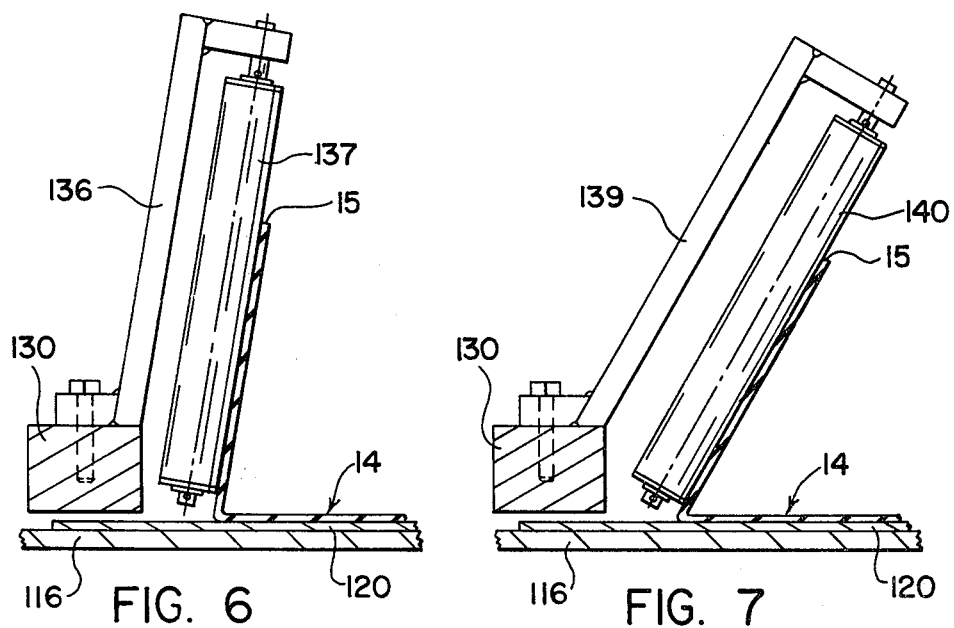

BELT FOLDING APPARATUS

BACKGROUND OF THE INVENTION

This invention relates to a tire belt folding apparatus for use in the preparation of belts, which are used in the manufacture of radial pneumatic tires.

As is well known in the art, the radial tire has a circumferentially extending tread portion, a belt underneath the tread portion, and sidewalls which are continuous at either side of the crown of the tire having laterally and downwardly extending portions. Beneath the belt and sidewall portions is the carcass of the tire constituting the body that imparts additional strength to the tire made up of a plurality of layers or plies of superimposed rubberized tire fabric that adheres firmly to each other and to the outer rubber covering during the vulcanization process.

The fabric for the belts and the plies is made up of a multiplicity of adjacent cords which, when initially made have the cord in parallel side-by-side relationship with a thin friction coat of rubber stock thereon and therebetween. The stock is cut on a bias to provide strips of fabric wherein the cords run from one side of the fabric piece to the other on a bias at a predetermined angle. The bias cut fabric material is spliced to provide a longitudinally extending ply stock material that can be used as belt material or as tire carcass material or ply stock wherein the bias-cut fabric is laid on the tire building drum for buildup of the green tire in cooperation with inextensible beads, and other ply stock including tread and sidewall rubber in a manner old and well known in the art. Accordingly, when fabricating a belt from bias-cut fabric care must be used in handling the belt fabric since it is important to maintain exact dimensions and control of the belt width.

The belt can be one or more layers designed to include folded plies with the edges thereof located along the shoulder of the tires or along the lateral edges of the tread portions. One particular problem with the use of belts is belt edge separation. Belt edge separation is the tendencies of the cut edges of the belt plies to pull away or separate from the other portions of the tire carcass, or from adjacent belt plies. Such belt edge separation adversely affects the tires reliability and durability. In order to improve tire performance an apparatus has been designed to receive belt material whose width is greater than the specifications that the tire requires, wherein the tire material is then folded regardless of width variations to provide an exact control on belt width dimensions while improving the characteristics of the respective lateral circumferential edges of the belt. The variation in width of material is automatically absorbed in that portion folded over. Two overlapping folded belts with their folded edges located on the respective lateral sides of the tire tread allow minimum distortion, with no pull down in belt width and angle. The apparatus for fabricating such belts is capable of folding rayon, fiberglass or wire materials. In the unique folding operation, the stitching done permits the continuous length of folded belt to be precisely cut or torn at the precise bias angle to the exact dimensions at the tire building machine.

SUMMARY OF THE INVENTION

The present invention contemplates a fold-over apparatus wherein a continuous length of fabric reinforced tire belt material is fed along a longitudinal pass line on a conveyor that biases one running edge along a predetermined edge guide member. The material is fed into a fold-over means which overlays the other running edge onto the belt material to provide a predetermined width belt in cooperation with such initial guide member. Such fold over means includes pressing rollers that firmly compresses only a portion of such overlapped portion which is adjacent the folded edge being formed. The fold over means also includes a pair of vertically aligned rollers that initiate the folding action by bending one edge in a direction that is normal to the belt material while successive inclined rollers continue the folding action in preparation for stitching action by the pressing rollers.

BRIEF DESCRIPTION OF THE DRAWINGS

FIG. 3 is a fragmentary front elevational view of a conveyor means and guide means for delivering belt fabric stock for folding taken along line 3—3 of FIG. 1B.

FIG. 4 is a front elevational view of the initial fold over means taken on line 4—4 of FIG. 1B.

FIG. 5 is a front elevational view of one of the fold over rollers taken on line 5—5 of FIG. 2B.

FIG. 6 is a front elevational view of another one of the fold over rollers taken on line 6—6 of FIG. 2B.

FIG. 7 is a front elevational view of another one of the fold over rollers taken on line 7—7 of FIG. 2B.

DETAILED DESCRIPTION

Figure 12:
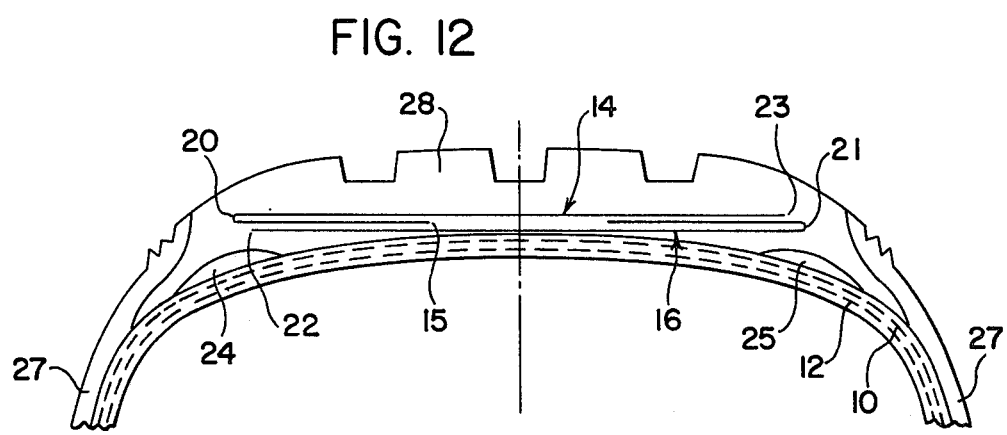
FIG. 12 is a cross-sectional view of the tread and shoulder portions of a tire showing the location of the belts.

Referring now to the drawings, wherein like reference numerals designate like or corresponding parts throughout the several views, there is shown in FIG. 12 two plies or layers of carcass cords 10 and 12 which may be rayon, polyester, or other suitable material which lie with the individual rubberized cords essentially in radial planes. The edges of the plies are suitably wrapped around inextensible bead grommets in a manner well known in the art.

The radial cord plies 10 and 12 located in the crown of the tire are encompassed by a pair of circumferentially extending folded belts 14 and 16. The cords in the respective belt plies 14 and 16 are parallel to each other and lie at a bias angle relative to the circumferential central plane of the tire. The cords in ply 14 extend in a direction opposite to that of the cords in ply 16. The marginal edge 20 and 21 of ply 14 and 16 respectively is a folded edge. The folded marginal edge 20 and 21 of ply 14 and ply 16 respectively are located axially outwardly of the cut ends 22 and 23 of ply 14 and 16 respectively. The other cut edge of belt 14 is designated as edge 15.

Belt plies 14 and 16 have cord angles from approximately 15 to approximately 25 degrees relative to the circumferential centerline of the tire. The belts are surrounded by rubber composition. Belt edge cushions 24 and 25 are located radially inwardly of the belt edges with sidewall rubber 27 surrounding the tire except for that portion of tread rubber 28 which is along the outer circumferential portion of the tire that is adapted to contact the road surface. The tread layer has suitable grooves and slits to provide a non-skid tread pattern.

The apparatus for manufacturing belt plies 14 and 16 includes a first conveyor 35 having a pair of spaced side supports 36 and 37 supporting a pair of spaced channel frames 38, 39 and 40. The forward portions of each channel frame 38 and 39 support a vertically extending post 42. In lateral alignment with each post 42 is a bracket 43 (FIG. 3) that journals for rotation a vertically extending threaded rod 44. Each rod 44 is threadedly engaged in the respective ends portions of a longitudinally extending plate member 45 whereby simultaneous rotation of the threaded rod 44 moves the plate member 45 upwardly or downwardly in accordance with the direction of rotation of such rods. The respective posts 42 (FIG. 2) have journaled thereon threaded rods 46 which in turn threadedly receive the respective end portions of a plate member 48 (FIG. 1B and FIG. 3). Extending laterally across and suitably connected to plate members 48 and 45 is a flat plate member 51 (FIG. 3), supporting for transverse movement thereon a plate member or carriage 52 which has a pair of U-shaped channel irons 55 and 56 suitably secured as by welding to the respective end portions thereof. Plate member 51 is recessed as at 57 along the center portion thereof to accommodate the passage of a threaded nut 58 therethrough, which nut 58 is secured to the carriage 52. A threaded rod 60, threadly received by nut 58 is journaled for rotation in plate member 48. Rod 60 extends through plate member 48 and has a wheel 61 with a handle 62 secured to the rod to rotate such rod which in turn can adjust the carriage 52 on plate member 51. A plurality of shafts 63 (FIG. 3) extend laterally between channels 55 and 56. Each shaft 63 has a plurality of spaced rollers 64 thereon, with spacers 65 therebetween. The belt ply 14 on conveyor 35 has at one cut edge 23 in rolling contact with a plurality of guide rollers 68, which rollers 68 are journaled on shafts 69 that are mounted on channel 56. To maintain the belt ply 14 in its flat condition a plurality of rollers 70 are also mounted for rotation on channel 56. The inclination of rollers 68 and 70 from the vertical and horizontal position is determined by the adjustment of threaded rods 44 and 46.

A pair of L-shaped brackets 72 and 73 (FIGS. 1B and 2B) have their one ends secured to side supports 36 and 37 and their other ends supporting an idler roller 74. The brackets 72 and 73 also support guide rollers 75 and 76 respectively to guide the lateral cut edges 23 and 15 of ply stock 14. A supply roller 77 mounted on shaft 78 supplies the belt ply material to the conveyor 35 after passing underneath dancer roll 79 that controls the rotation of shaft 78 in a manner old and well known in the art. The liner material that separates the rolled belt ply material on supply roll 77 is not shown, however, this is conventional in the art.

Suitably mounted on the forward portion of channel 40 is a vertically extending cylindrical support 80 having a pair of spaced keyways 81 and 82 to guide the vertical movement of slides 83 and 84 respectively thereon. Slide 83 has a horizontally extending shaft 85 with idler rollers 86 journaled thereon to support the belt ply 14. Also journaled on shaft 85 between the slide 83 and the closest idler roller 86 thereto is a flanged disc 90. Slide 84 has a threaded bore 91 that is connected to a threaded rod 92 journaled for rotation in a bracket 93 that is mounted on cylindrical support 80. A handle 95 and wheel 96 is connected to rod 92 to provide means for vertically adjusting the slide 84 and a horizontal extending shaft 97 thereon. Shaft 97 has a keyway 98 thereon such that a bracket 99 journaled on shaft 97 is keyed to keyway 98 to assure rectilinear motion on such shaft 97. A bracket 100 mounted on the end portion of shaft 97 has journaled thereon a threaded rod 101 which in turn is threadedly connected to the bracket 99. The one end of threaded rod 101 has a wheel 102 and a handle 103 connected thereto. Journaled for rotation on bracket 99 is a folder disc 105. With the adjustment of slide 84 and bracket 99 relative to slide 83, the respective discs 105 and 90 are positioned relative to each other to initiate a folding action to the belt 14.

Figure 1A:
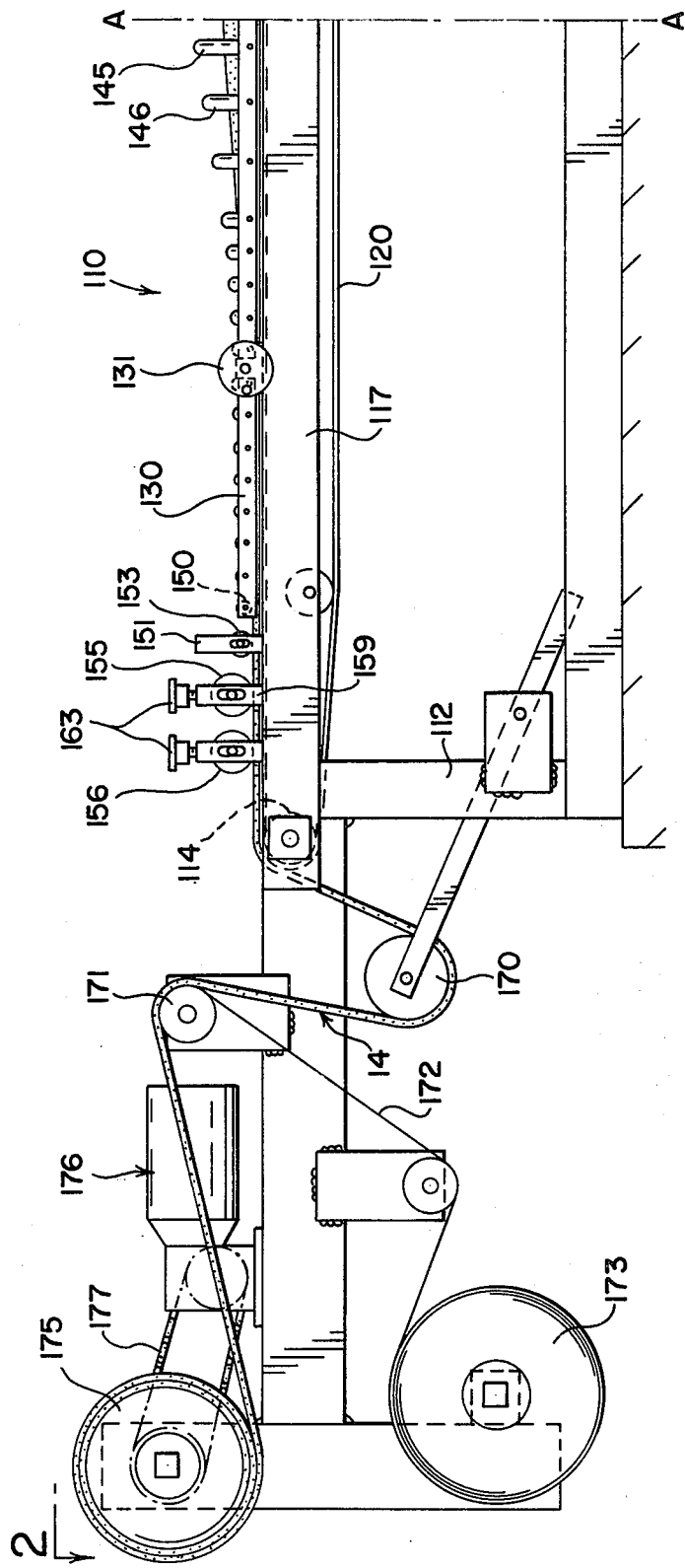
FIGS. 1A & 1B are longitudinal side elevational views having portions of the frame structures removed to more clearly show the invention of the belt folding apparatus in accordance with the principles of this invention which when longitudinally aligned on lines A—A show the entire belt folding apparatus of this invention.
Figure 1B:
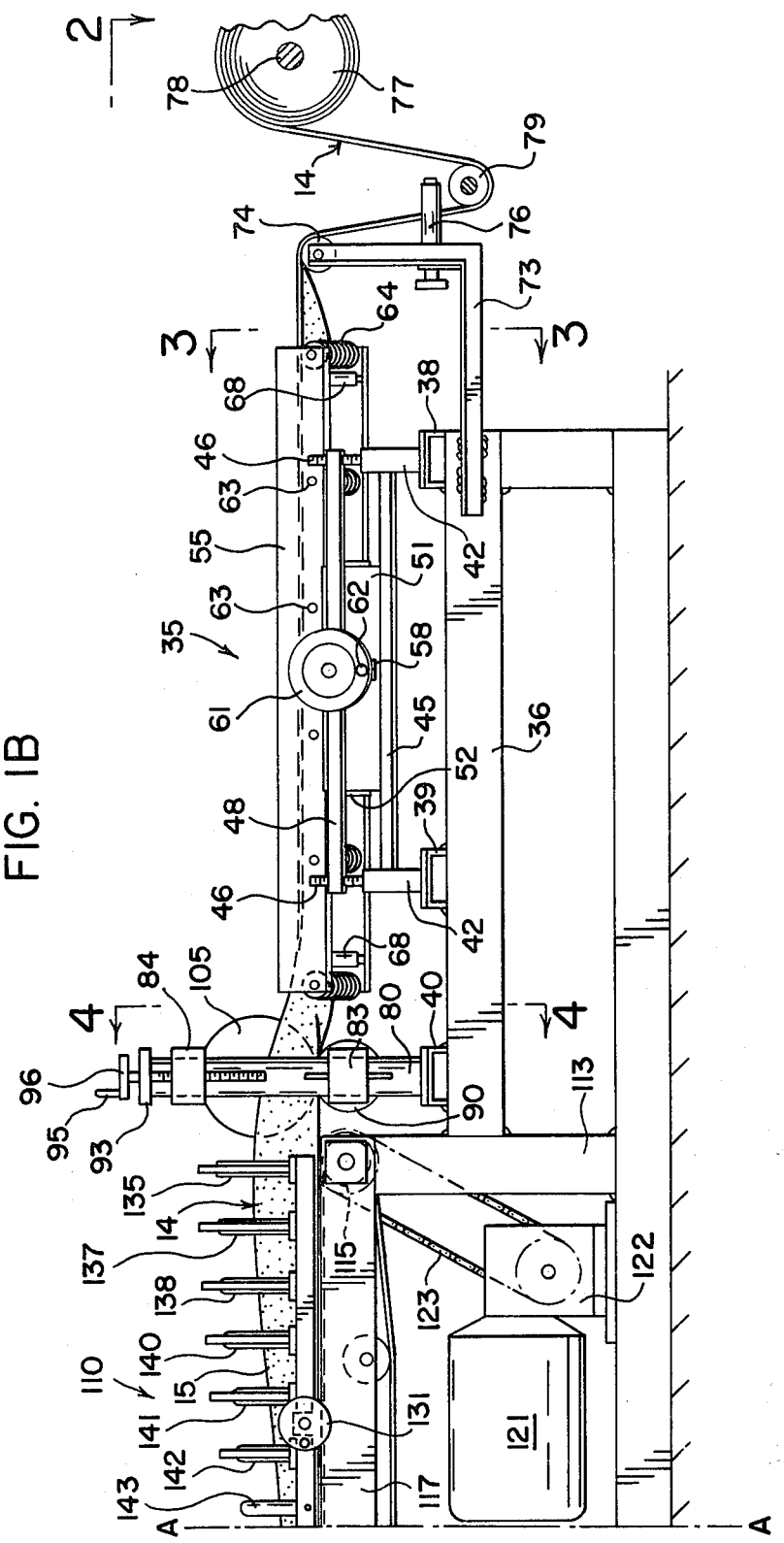

A second conveyor 110, located downstream of the folder discs 105 and 90, is mounted on a plurality of support 112 and 113 (FIG. 1A). A pair of spaced rollers 114 and 115 are journaled for rotation on supports 112 and 113 respectively. A deck plate 116 (FIG. 2A) with suitable side supports 117 and 118 are suitably connected to the vertical support 112 and 113. An endless conveyor 120 is supported by the deck plate 116 and is trained about the end rollers 114 and 115. A motor 121 through suitable transmission means 122 provides an output to a chain drive 123 which in turn drives conveyor roller 115 and the endless conveyor 120.

Figure 2A:
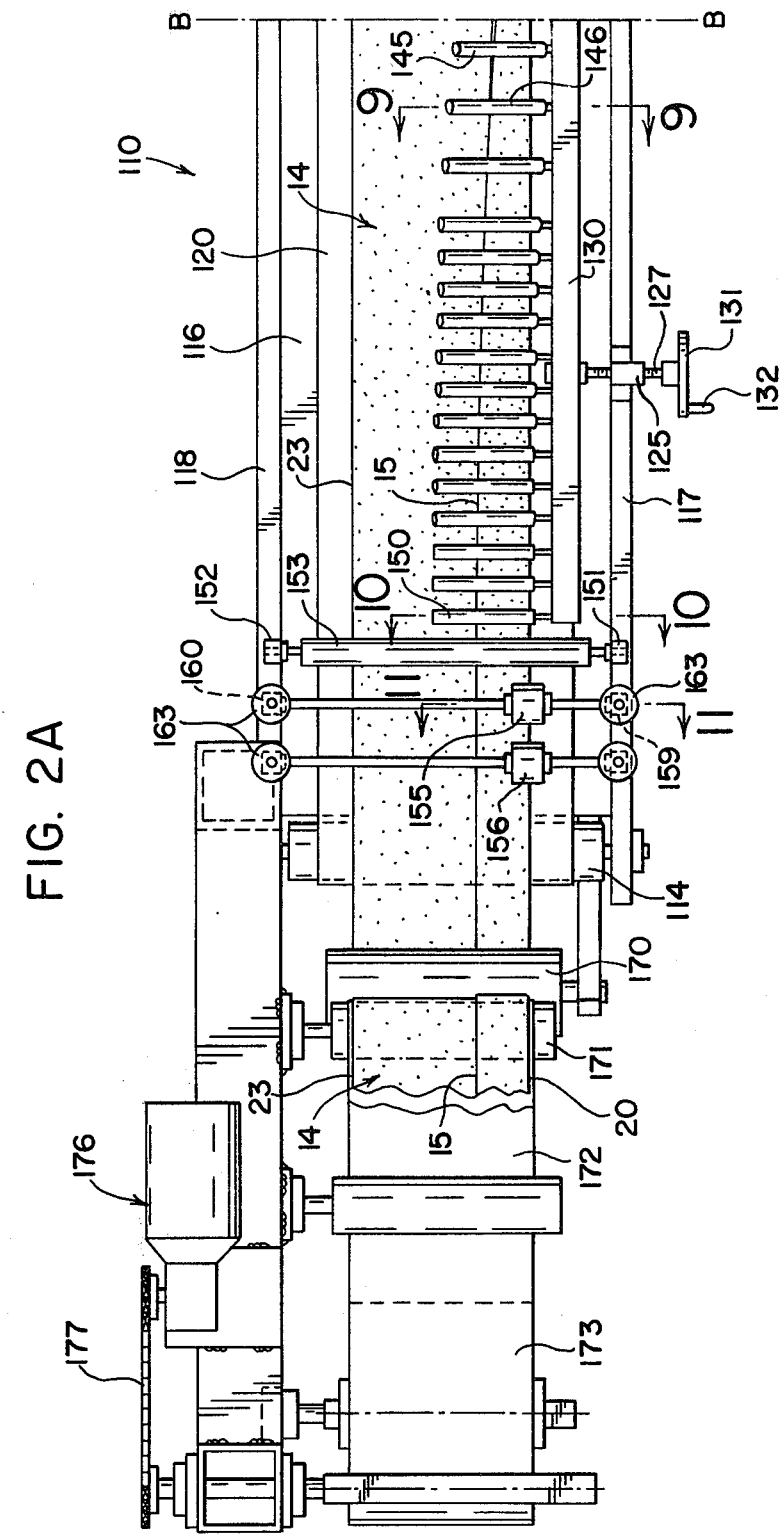
FIGS. 2A & 2B are plan view of the belt folding apparatus which when longitudinally aligned on lines B—B show the entire belt folding apparatus of this invention.
Figure 2B:
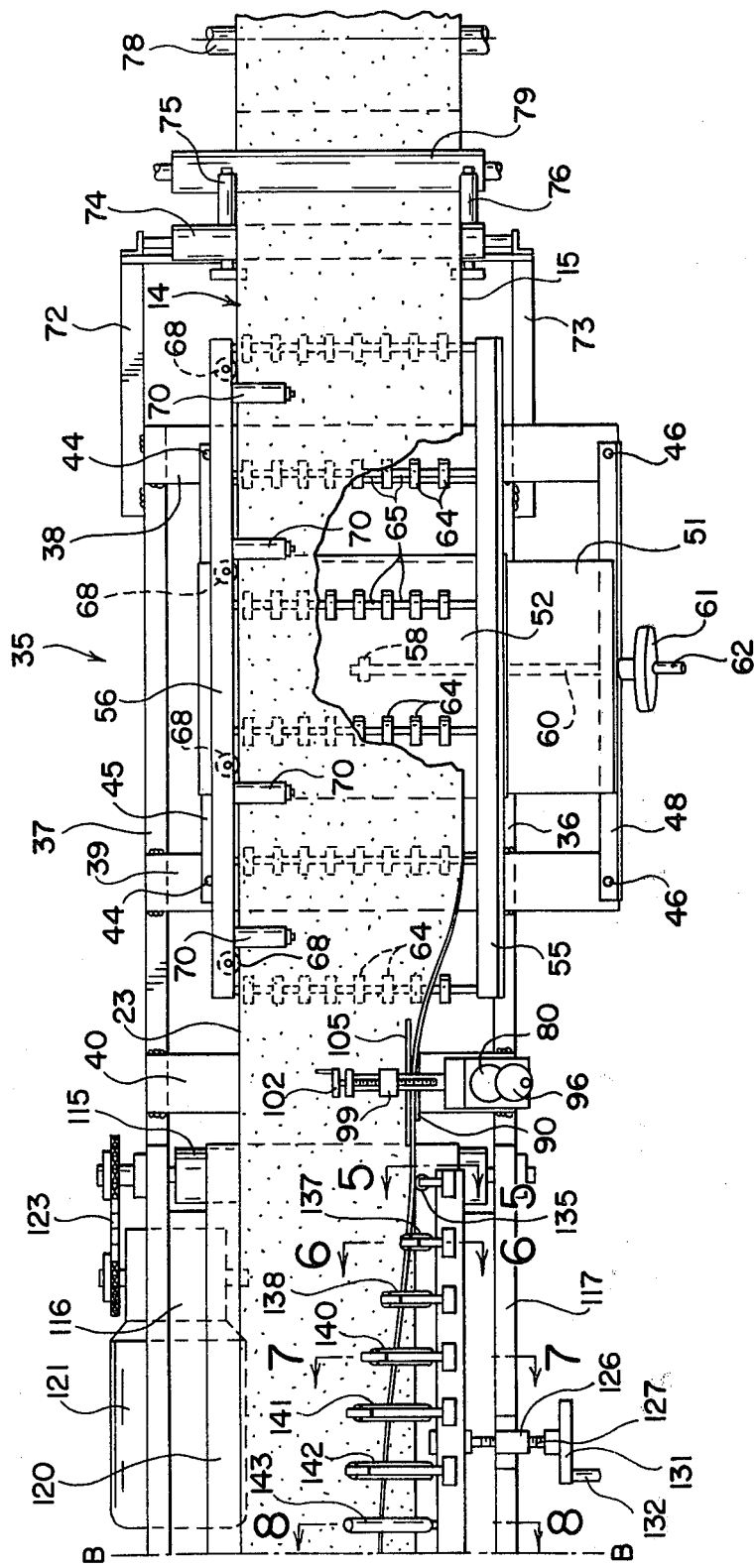

As seen in FIG. 2A, a pair of spaced bosses 125 and 126 are suitably mounted on side supports 117. Journaled for rotation in each bosses 125 and 126 is a threaded rod 127 having the one end thereof connected to a longitudinally extending bracket 130. The other end of each threaded rod 127 is connected to a wheel 131 and a handle 132 whereby simultaneous rotation of handles 132 moves the bracket 130 laterally across the endless conveyor belt 120. Suitable guide rods may be used to interconnect the bracket 130 and side supports 117 to provide additional support for bracket 130 and to maintain lateral alignment of such bracket 130 as it is adjusted. Mounted on bracket 130 closely adjacent the folding discs 105 and 90 is a vertically extending bracket 134 (FIG. 5) having a vertically disposed roller 135 journaled thereon. Mounted on bracket 130 adjacent to bracket 134 is a generally vertically extending bracket 136 supporting a roller 137 whose axis makes an angle of approximately 10° (ten degrees) from the vertical. A roller 138 (FIG. 2B) mounted adjacent to roller 137 on bracket 130 has an axis which makes an angle of approximately twenty degrees from the vertical. Mounted on bracket 130 adjacent to roller 138 is a bracket 139 (FIG. 7) supporting a roller 140 whose axis makes an angle of approximately thirty degrees from the vertical. Mounted on a suitable support on bracket 130 adjacent to roller 140 is a roller 141 (FIG. 2A) whose axis makes an angle of approximately forty degrees from the vertical.

Figure 8:
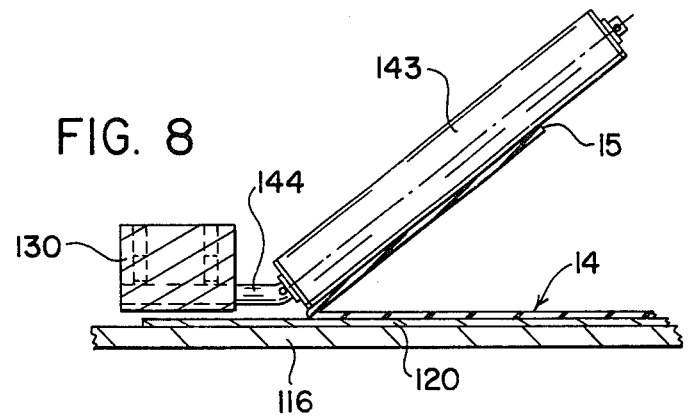
FIG. 8 is a front elevational view of another one of the fold over rollers taken on line 8—8 of FIG. 2B.
Figure 9:
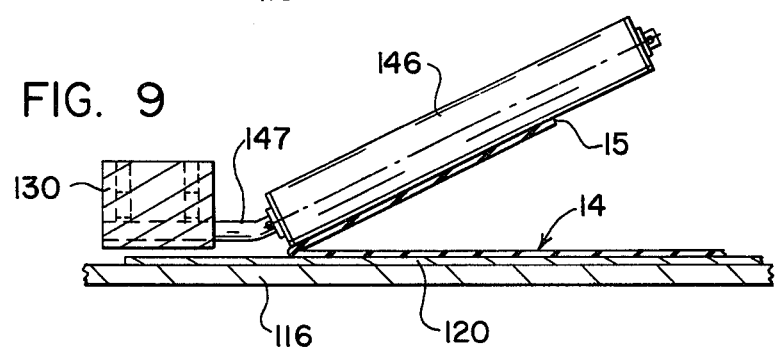
FIG. 9 is a front elevational view of another one of the fold over rollers taken on line 9—9 of FIG. 2A.
Figure 10:
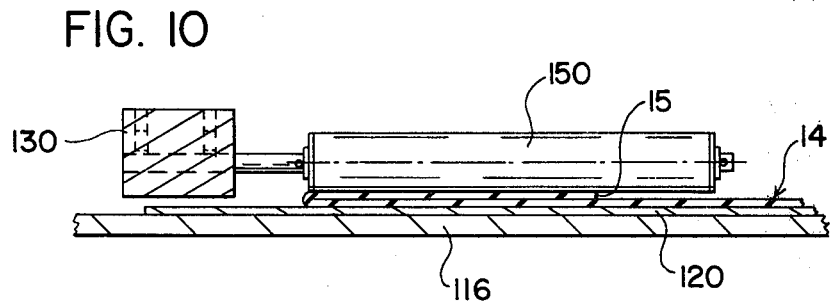
FIG. 10 is a front elevational view of another one of the fold over rollers taken on line 10—10 of FIG. 2A.
Figure 11:
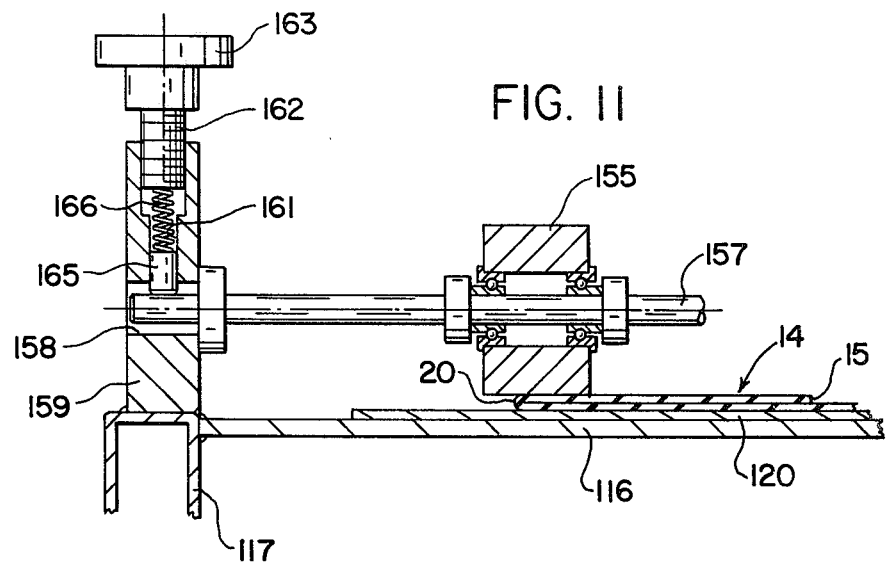
FIG. 11 is a front elevational view partly in cross-section of a stitching roller taken on line 11—11 of FIG. 2A.

Mounted via suitable means on bracket 130 adjacent to roller 141 is a roller 142 (FIG. 1B). The axis of roller 142 makes an angle of approximately 46 degrees with the vertical. As seen in FIG. 8 a roller 143 is journaled on a shaft 144 that is mounted on bracket 130. A roller 145 is mounted on bracket 130 adjacent to roller 143. The axis of rollers 143 and 145 make angles of 52 and 58 degrees respective from the vertical. Mounted adjacent roller 145 is a roller 146 (FIG. 9) on a shaft 147 that has its one end connected to bracket 130. The axis of roller 146 makes an angle of approximately 64° with the vertical. Downstream of the rollers 135-137-138-140-141-142-143-145 and 146 are additional rollers journaled on shafts that are mounted on bracket 130 and the axes of such additional rollers progressive increase in their indication from the vertical until the last of such rollers 150 and the shaft on which it is mounted is in a horizontal position. Such rollers 135-137-138-140-141-142-143-145-146 and 150 along with the unnumbered rollers cooperate with the discs 105 and 90 to provide a fold-over means which folds the cut edge 15 over onto the belt 14 effecting a 180° turnover. The roller 150 while effecting the completion of the fold-over does not stitch the overlapping belt portions together since it is necessary for the tire building operator to sever the belt ply material at the desired length as it is wound onto the tire carcass of the green tire being built. Such severing or tearing is done along the bias cord angle at a cord or between cords.

Closely adjacent to the roller 150 are a pair of laterally spaced journals 151 and 152 journaling a transversely extending roller 153. Such roller is operative to assure the smooth passage of the folded belt ply stock on the conveyor. Mounted downstream in tandem adjacent to roller 153 are stitching rollers 155 and 156. Each of these stitching rollers are identical in construction and only one will be described. Roller 155 is journaled for rotation on a shaft 157, which shaft 157 is journaled at its respective ends in elongated bores 158, in bosses 159 and 160. A vertically extending bore 161 intersects bore 158. The upper end portion of bore 161 is enlarged and threaded to receive a threaded bolt 162 having an enlarged cylindrical head 163. A cylindrical plunger 165 located within bore 161 is biased by a spring 166 into frictional engagement with shaft 157. Adjustment of threaded bolt 162 upwardly or downward determines the force exerted by stitching roller 155 on the folded portion of the belt.

As the folded belt is discharged from conveyor 110, belt 14 is directed underneath dancer roll 170, thence toward an idler roller 171 where a liner 172 is also directed thereto from a supply roll 173. The combined liner and belt 14 from roller 171 are wound up into take-up roll 175 which is power driven from a suitable power source 176 via chain 177. Dancer roll 170 controls the speed of operation of power source 176 to control the wind up.

In the operation of the described apparatus a belt ply such as ply stock 14 having cut edges 15 and 23 is fed from supply roller 77 underneath dancer roll 79 and up onto the first conveyor 35, with the one cut edge 23 coming into contact with guide rollers 68. As seen in FIG. 3, the rollers 64 of conveyor 35 are inclined towards the side edge guide rollers 68 thereby biasing the belt ply into edge alignment therewith, thereby forming a frame of reference for determining the belt width. As the belt ply 14 is conveyed along such conveyor 35, a pair of adjustable cooperative belt folding discs 105 and 90 engage the belt ply and initiate the folding operation while the belt ply is still guided. Closely adjacent to the folding discs 90 and 105 are a series of rollers that progressively fold over the fold that was initiated until the folded over portion is ready to be stitched to the belt ply. As in FIG. 5, the first roller 135 is vertically disposed followed by a second roller 137 that inclines the belt ply slightly over towards the belt ply. Successive rollers then increase the incline or folding over until the last roller 150 which is horizontally disposed, assures a completion of the folding over. Such rollers 135-137-138-140-141-142-143-145-146 and 150 along with the unnumbered rollers cooperate to provide a fold over means that effects a 180° turn over of the stock. The roller 150 does not exert any heavy pressure on the ply stock but assures a continued travel thereunder until the folded belt ply comes into frictional rolling engagement with the adjacent tandem stitching rollers 155 and 156. The degree of pressure exerted by the rollers 155 and 156 can be adjusted by the rotation of the knobs 163. India markings (not shown) on the outer upper cylindrical surface of bosses 159 and 160 facilitate this adjustment. The folded belt ply is then wound up onto the take-up roll 175 with a liner 172 separating the layers. The speed of roll 175 is controlled by a dancer roll 170 through means old and well known in the art.

Various modifications are contemplated and may obviously be resorted to by those skilled in the art without departing from the described invention, as hereinafter defined by the appended claims, as only a preferred embodiment thereof has been disclosed.

I claim:

1. An apparatus for making folded belts comprising support means; conveyor means mounted on said support means for providing a longitudinal moving support with a longitudinal center line; said conveyor means having a receiving end and a discharge end; first supply means for supplying in a continuous length an elongated fabric reinforced belt material with spaced side edges for movement onto said receiving end of said conveyor means for movement therewith; guide means cooperative with said conveyor means for maintaining one edge of said fabric belt material a predetermined distance from said center-line; fold-over means on said support means for folding the other one of said side edges of said belt fabric material over into said fabric material in overlapping relationship forming an overlapping portion to locate said other edge between said center line and the folded edge being formed; stitching means mounted on said support means for stitching a portion of said overlapped portion only onto said moving belt being formed into firm adhesion to each other to form a belt; wind-up means located adjacent said discharge end of said conveyor for winding up said formed belt;

said stitching means having a pair of rollers located in tandem; the terminal ends of said rollers contracting said overlapping portion is located closer to said folded edge than said center line;

said fold-over means includes a pair of vertically aligned overlapping discs that fold said other edge upwardly relative to said belt material conveyed by said conveyor means; a plurality of inclined rollers downstream from said discs operative to fold over said upwardly extending portion in progressive steps onto said moving fabric reinforced belt material to form said folded belt;

a second conveyor cooperates with said fold-over means to maintain support for said folding and stitching; and said first mentioned conveyor means is inclined towards said guide means to maintain a predetermined alignment and distance of said fabric reinforced belt material as it is fed to said fold-over means.

2. An apparatus for making folded belts as set forth in claim 1 wherein said guide means and said first conveyor means is adjustable laterally relative to said longitudinal center line to provide a predetermined distance between said fold-over means and said guide means.

3. An apparatus for making folded belts as set forth in claim 2 wherein vertically aligned discs are mounted on slides that are adjustable relative to said longitudinal center line and to each other.

4. An apparatus for making folded belts as set forth in claim 3 wherein said plurality of inclined rollers downstream of said overlapping discs are mounted on a slide that is adjustable transversely of said longitudinal center line.

* * * * *